US009774212B2

(12) United States Patent
Wu et al.

(10) Patent No.: US 9,774,212 B2
(45) Date of Patent: Sep. 26, 2017

(54) WIRELESS CHARGING DEVICE AND WIRELESS CHARGING METHOD FOR CHARGING ELECTRONIC DEVICE

(71) Applicant: Wistron Corporation, New Taipei (TW)

(72) Inventors: Wen-Chin Wu, New Taipei (TW); Yi-Sheng Kao, New Taipei (TW); Yao-Tsung Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 186 days.

(21) Appl. No.: 14/881,131

(22) Filed: Oct. 12, 2015

(65) Prior Publication Data

US 2017/0033588 A1 Feb. 2, 2017

(30) Foreign Application Priority Data

Jul. 27, 2015 (TW) .............................. 104124215 A (51) Int. Cl.
*H01M 10/44* (2006.01)
*H01M 10/46* (2006.01)
*H02J 7/02* (2016.01)
*H02J 7/00* (2006.01)

(52) U.S. Cl.
CPC ............ *H02J 7/025* (2013.01); *H02J 7/0042* (2013.01)

(58) Field of Classification Search
CPC .......... H02J 7/355; H02J 7/0042; H02J 7/025; H02J 5/005; H02J 7/1423; H02J 7/0013
USPC ......................... 320/107, 108, 114, 115, 116
See application file for complete search history.

(56) References Cited

U.S. PATENT DOCUMENTS

| 8,248,028 B2 | 8/2012 | Toya | |
|---|---|---|---|
| 2011/0115891 A1* | 5/2011 | Trusty | A61B 1/00016 348/65 |
| 2013/0234653 A1* | 9/2013 | Botts | H02J 7/0042 320/107 |
| 2016/0114687 A1* | 4/2016 | Ichikawa | B60L 5/005 701/22 |
| 2016/0201253 A1* | 7/2016 | Kulkarni | D06F 58/28 307/104 |
| 2016/0276865 A1* | 9/2016 | Pike | B60R 11/0241 |

* cited by examiner

*Primary Examiner* — Edward Tso
(74) *Attorney, Agent, or Firm* — Winston Hsu (57) ABSTRACT

A wireless charging device includes a base, a motor, a rotating member and a first transmitting coil. The base has a hollow pillar and a ring-shaped groove around the hollow pillar. The motor is movably disposed in the hollow pillar and has a rotating axle. The rotating member is connected to a first end of the rotating axle. The first transmitting coil is disposed on the rotating member. When an electronic device is placed in the ring-shaped groove, the motor drives the first transmitting coil to move and rotate to a position corresponding to a receiving coil of the electronic device, such that the first transmitting coil cooperates with the receiving coil to charge the electronic device.

18 Claims, 10 Drawing Sheets

WIRELESS CHARGING DEVICE AND WIRELESS CHARGING METHOD FOR CHARGING ELECTRONIC DEVICE

BACKGROUND OF THE INVENTION

1. Field of the Invention

The invention relates to a wireless charging device and a wireless charging method and, more particularly, to a wireless charging device and a wireless charging method using a single motor to drive a transmitting coil to move and rotate to a position corresponding to a receiving coil of an electronic device.

2. Description of the Prior Art

So far various electronic devices including a mobile phone, a tablet computer and so on get more and more popular, such that wireless charging technology is becoming a noticeable issue. If a wireless charging device can only charge a single electronic device, it will be very inconvenient for a user owning a plurality of electronic devices. Therefore, how to allow a wireless charging device to charge a plurality of electronic devices automatically becomes an important issue for designing the wireless charging device. In the prior art, U.S. Pat. No. 8,248,028 (hereinafter '028 patent) had disclosed a wireless charging device capable of charging a plurality of electronic devices automatically. However, since '028 patent needs to use two sets of motors and guide rods to move the transmitting coil, the structure is complicated and the manufacturing cost is high. Furthermore, there is another prior art disposing a plurality of transmitting coils in the wireless charging device, so as to charge a plurality of electronic devices. However, the more the transmitting coils are, the higher the manufacturing cost is.

SUMMARY OF THE INVENTION

The invention provides a wireless charging device and a wireless charging method, so as to solve the aforesaid problems.

According to the claimed invention, a wireless charging device comprises abase, a motor, a rotating member and a first transmitting coil. The base has a hollow pillar and a ring-shaped groove around the hollow pillar. The motor is movably disposed in the hollow pillar and the motor has a rotating axle. The rotating member is connected to a first end of the rotating axle. The first transmitting coil is disposed on the rotating member. When an electronic device is placed in the ring-shaped groove, the motor drives the first transmitting coil to move and rotate to a position corresponding to a receiving coil of the electronic device, such that the first transmitting coil cooperates with the receiving coil to charge the electronic device.

According to the claimed invention, the wireless charging device further comprises a screw nut disposed in the hollow pillar. A second end of the rotating axle has an external screw thread, such that the second end of the rotating axle is rotatably connected to the screw nut, wherein the first end is opposite to the second end.

According to the claimed invention, the base further has a restraining hole located in the hollow pillar and the motor further has a restraining pillar movably disposed in the restraining hole.

According to the claimed invention, before charging the electronic device, the motor drives the first transmitting coil to move and rotate to a plurality of heights and a plurality of directions, the first transmitting coil detects a plurality of loadings for the heights and the directions, and the height and the direction where a maximum value of the loadings is located at represent the position corresponding to the receiving coil of the electronic device.

According to the claimed invention, when a plurality of the electronic devices are disposed in the ring-shaped groove, the heights and the directions where a plurality of peak values of the loadings are located at represent the positions corresponding to the receiving coils of the electronic devices.

According to the claimed invention, the wireless charging device further comprises a circuit board, a control unit, a calculating unit and a memory unit. The circuit board is disposed in the hollow pillar and the first transmitting coil is electrically connected to the circuit board. The control unit is disposed on the circuit board and the control unit controls the motor. The calculating unit is disposed on the circuit board and the calculating unit determines intensity values of the loadings. The memory unit is disposed on the circuit board and the memory unit records the heights, the directions and the loadings.

According to the claimed invention, the wireless charging device further comprises a detecting unit disposed on the rotating member, wherein before charging the electronic device, the motor drives the first transmitting coil to move and rotate to a plurality of heights and a plurality of directions, the detecting unit detects a plurality of loadings for the heights and the directions, and the height and the direction where a maximum value of the loadings is located at represent the position corresponding to the receiving coil of the electronic device.

According to the claimed invention, when a plurality of the electronic devices are disposed in the ring-shaped groove, the heights and the directions where a plurality of peak values of the loadings are located at represent the positions corresponding to the receiving coils of the electronic devices.

According to the claimed invention, the wireless charging device further comprises a circuit board, a control unit, a calculating unit and a memory unit. The circuit board is disposed in the hollow pillar and the first transmitting coil is electrically connected to the circuit board. The control unit is disposed on the circuit board and the control unit controls the motor. The calculating unit is disposed on the circuit board and the calculating unit determines intensity values of the loadings. The memory unit is disposed on the circuit board and the memory unit records the heights, the directions and the loadings.

According to the claimed invention, the wireless charging device further comprises a second transmitting coil disposed on the rotating member and opposite to the first transmitting coil.

According to the claimed invention, a wireless charging standard of the first transmitting coil is identical to a wireless charging standard of the second transmitting coil.

According to the claimed invention, a wireless charging standard of the first transmitting coil is different from a wireless charging standard of the second transmitting coil.

According to the claimed invention, a wireless charging method is adapted to a wireless charging device. The wireless charging device comprises a base, a motor, a rotating member and a transmitting coil. The base has a hollow pillar and a ring-shaped groove around the hollow pillar. The motor is movably disposed in the hollow pillar and the motor has a rotating axle. The rotating member is connected to the rotating axle. The first transmitting coil is disposed on the rotating member. The wireless charging method comprises steps of when an electronic device is placed in the ring-shaped groove, the motor driving the transmitting coil to move and rotate to a plurality of heights and a plurality of directions; detecting a plurality of loadings for the heights and the directions, wherein the height and the direction where a maximum value of the loadings is located at represent a position corresponding to a receiving coil of the electronic device; the motor driving the transmitting coil to move and rotate to the position corresponding to the receiving coil of the electronic device; and the transmitting coil cooperating with the receiving coil to charge the electronic device.

According to the claimed invention, when a plurality of the electronic devices are disposed in the ring-shaped groove, the heights and the directions where a plurality of peak values of the loadings are located at represent the positions corresponding to the receiving coils of the electronic devices.

According to the claimed invention, when the plurality of the electronic devices are disposed in the ring-shaped groove, the wireless charging method further comprises step of charging the electronic device having a maximum amount of power first.

According to the claimed invention, when the plurality of the electronic devices are disposed in the ring-shaped groove, the wireless charging method further comprises step of charging the electronic device having a minimum amount of power first.

According to the claimed invention, when the plurality of the electronic devices are disposed in the ring-shaped groove, the wireless charging method further comprises step of charging the electronic device having a shortest distance with respect to the transmitting coil first.

According to the claimed invention, when the plurality of the electronic devices are disposed in the ring-shaped groove, the wireless charging method further comprises step of charging the electronic device detected prior to other electronic devices first.

As mentioned in the above, the invention uses a single motor to drive the transmitting coil to move and rotate to a position corresponding to the receiving coil of the electronic device, such that the first transmitting coil cooperates with the receiving coil to charge the electronic device. Since the invention uses the single motor to move and rotate the transmitting coil, the structure of the invention is simple and the manufacturing cost can be reduced effectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
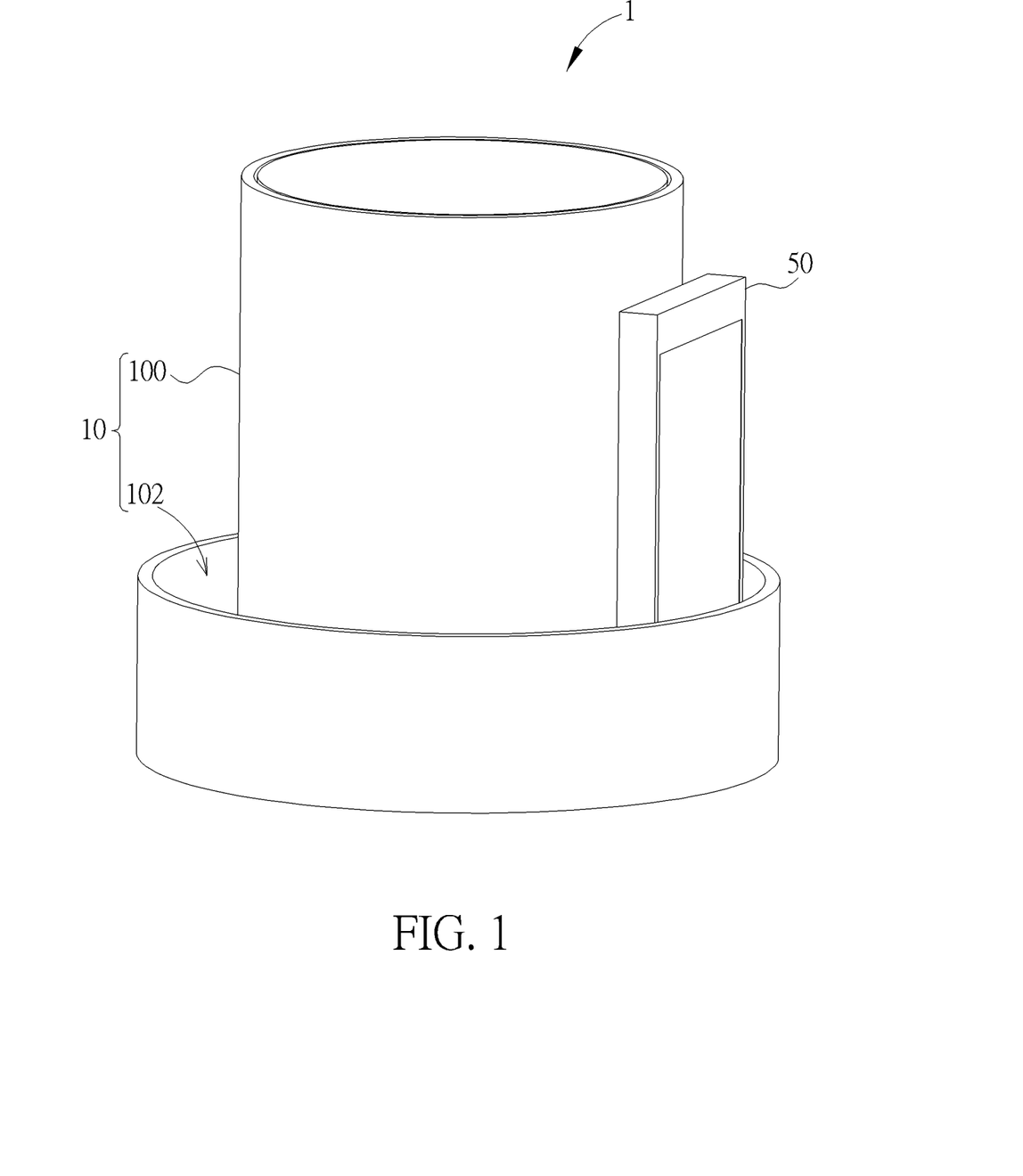
FIG. 1 is a perspective view illustrating a wireless charging device according to an embodiment of the invention.
Figure 2:
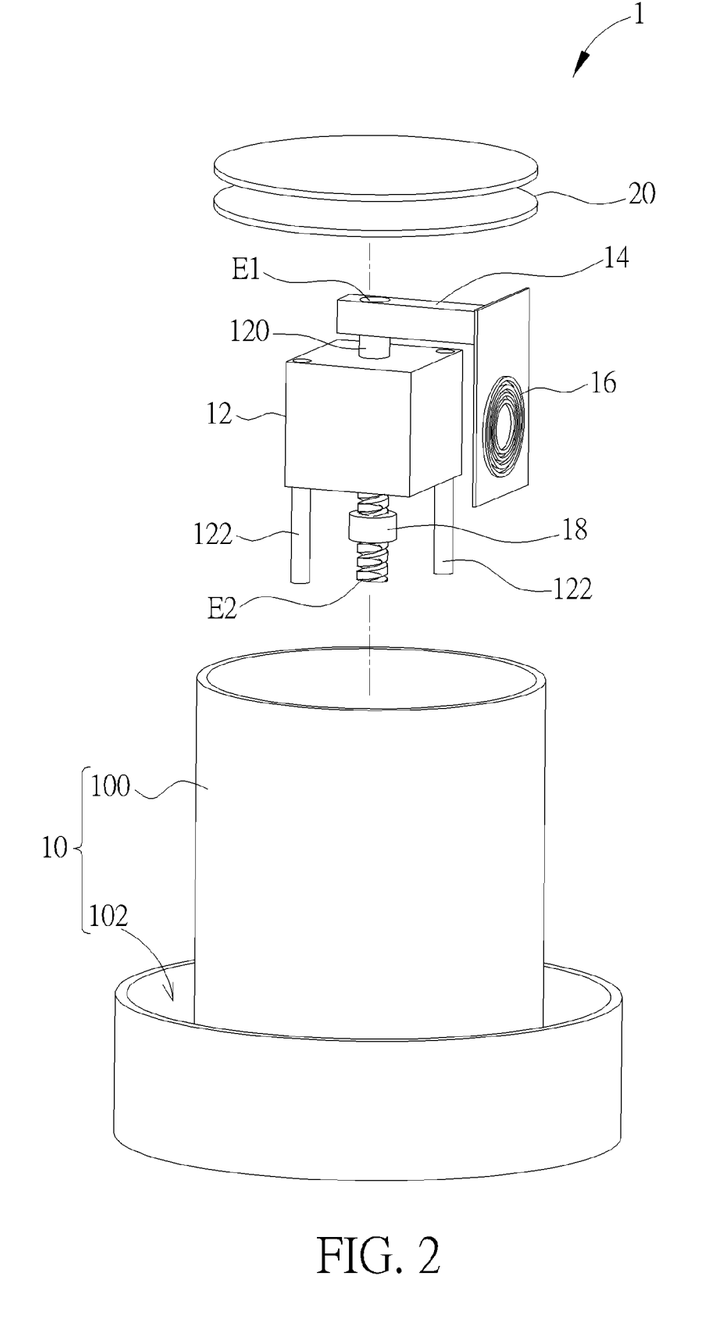
FIG. 2 is an exploded view illustrating the wireless charging device shown in FIG. 1.
Figure 3:
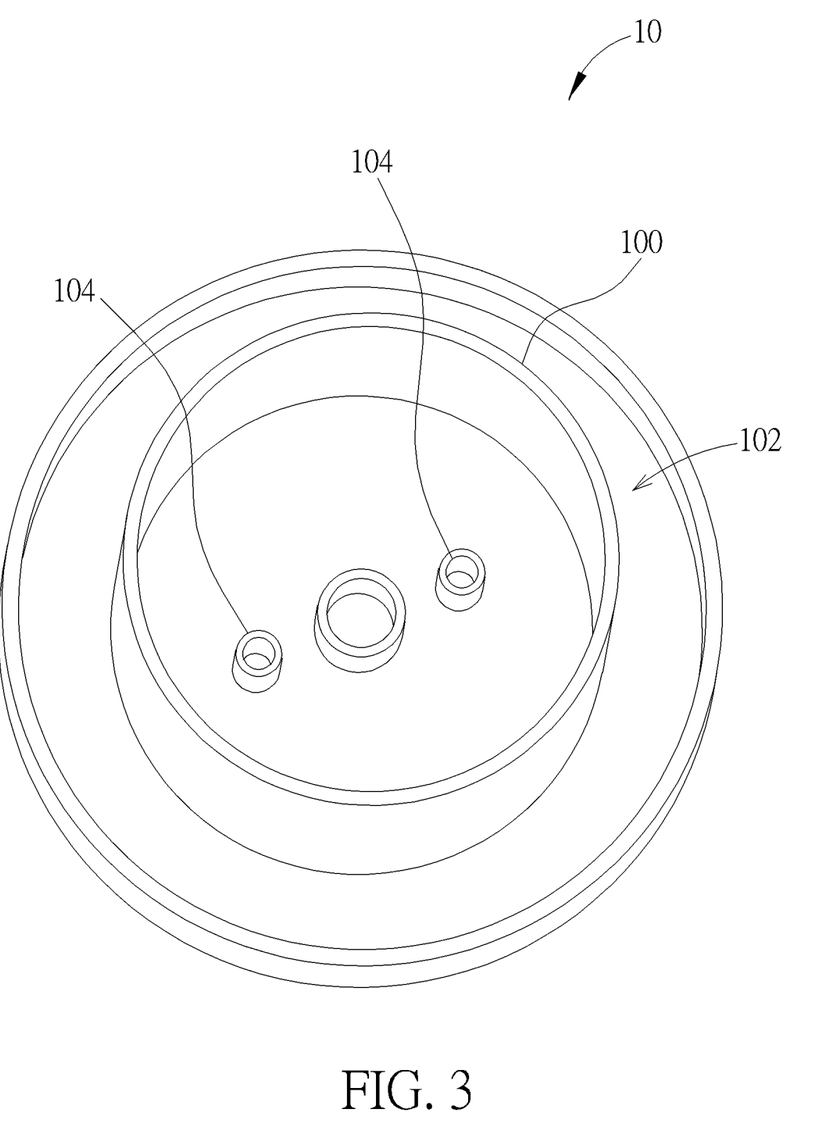
FIG. 3 is a perspective view illustrating the base shown in FIG. 2 from another viewing angle.
Figure 4:
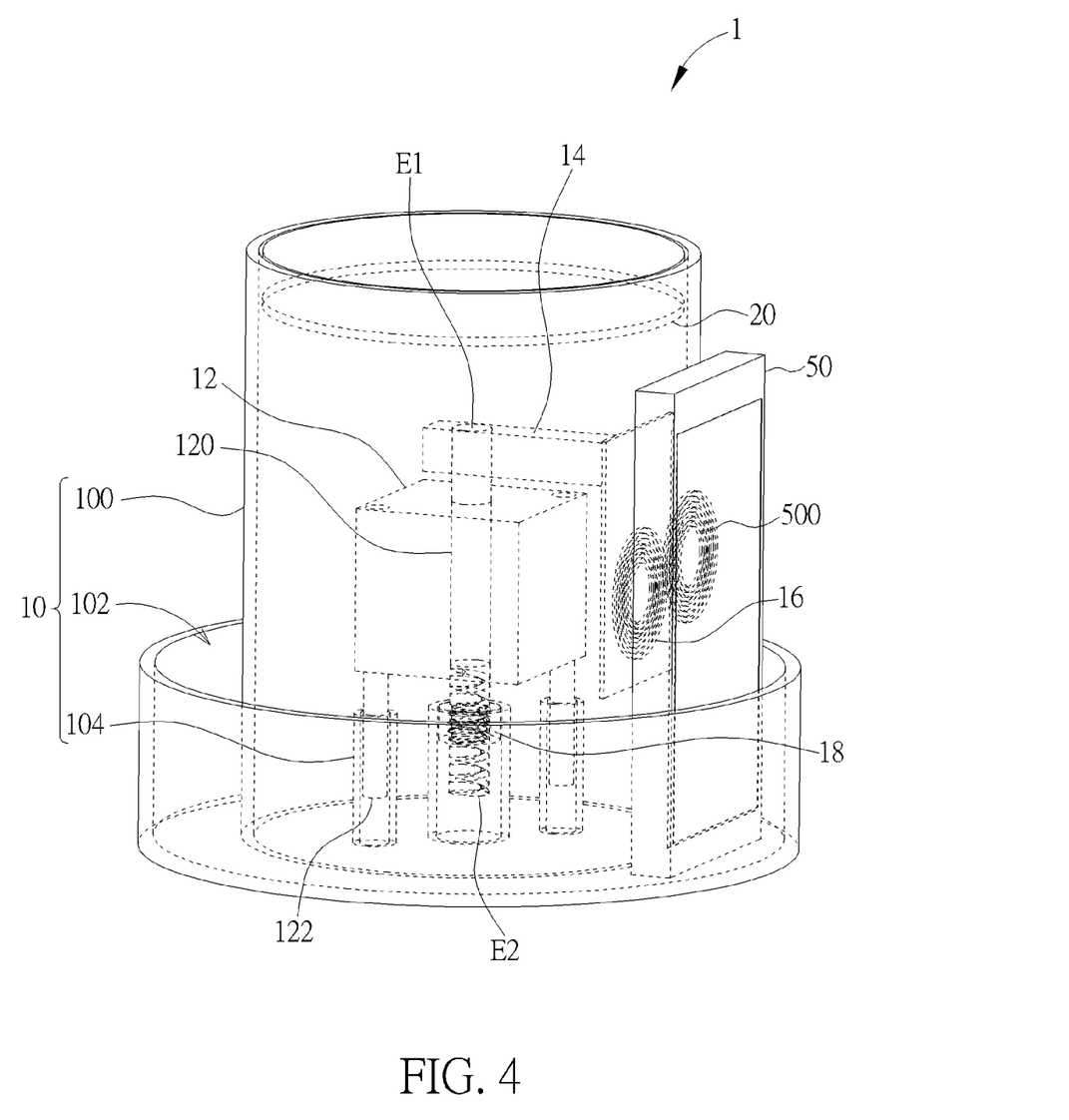
FIG. 4 is a perspective view illustrating the wireless charging device shown in FIG. 1.
Figure 5:
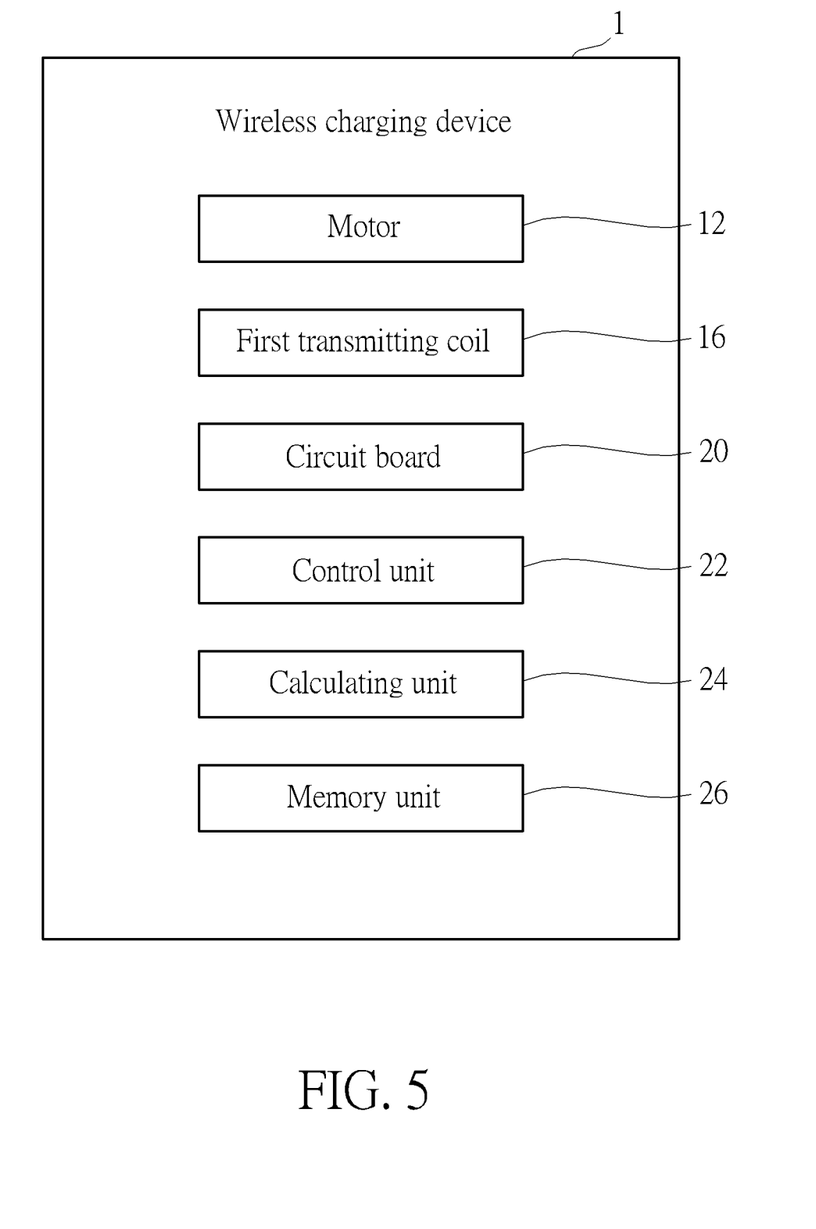
FIG. 5 is a functional block diagram illustrating the wireless charging device shown in FIG. 1.
Figure 6:
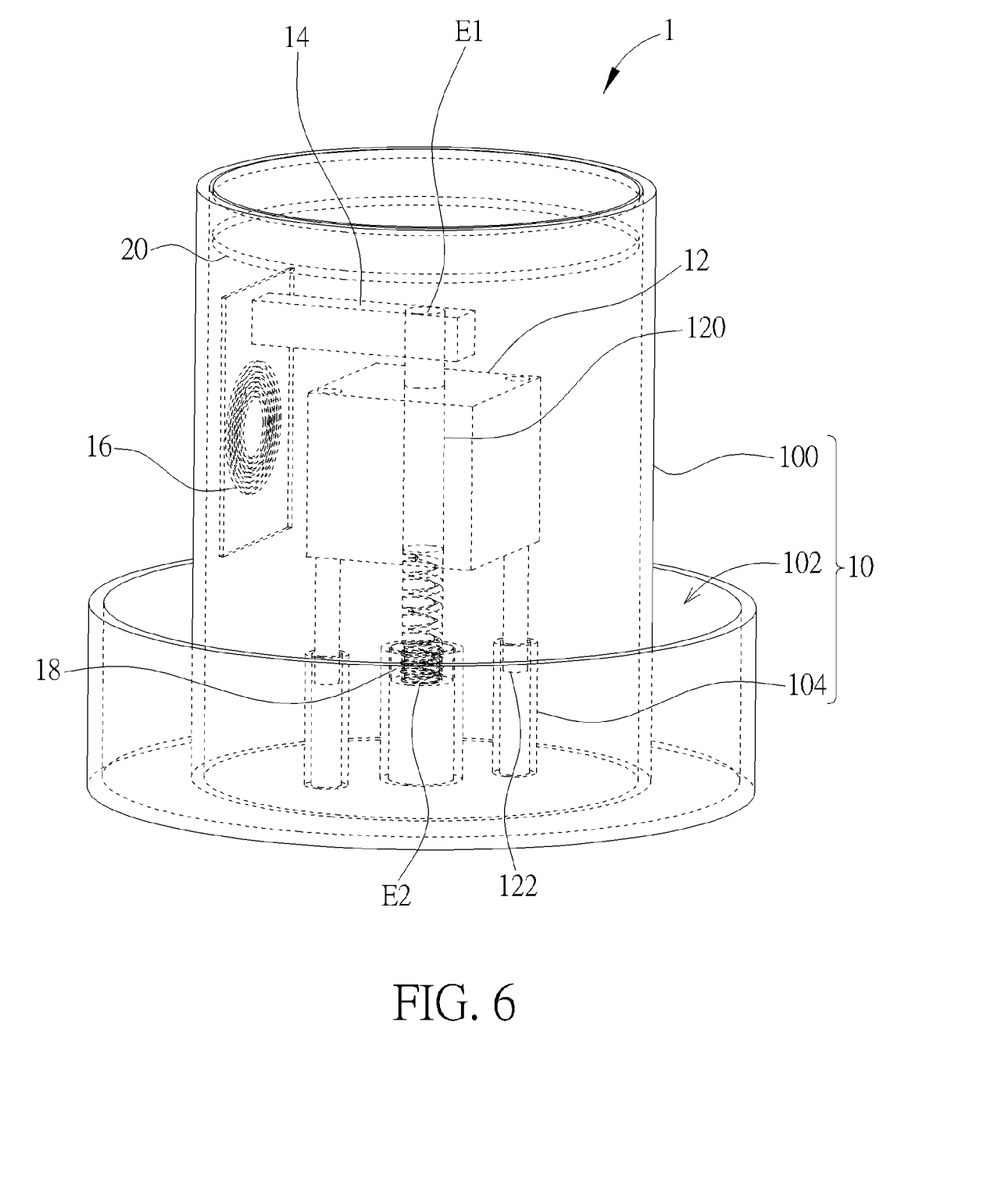
FIG. 6 is a perspective view illustrating the rotating axle shown in FIG. 2 driving the rotating member to rotate.
Figure 7:
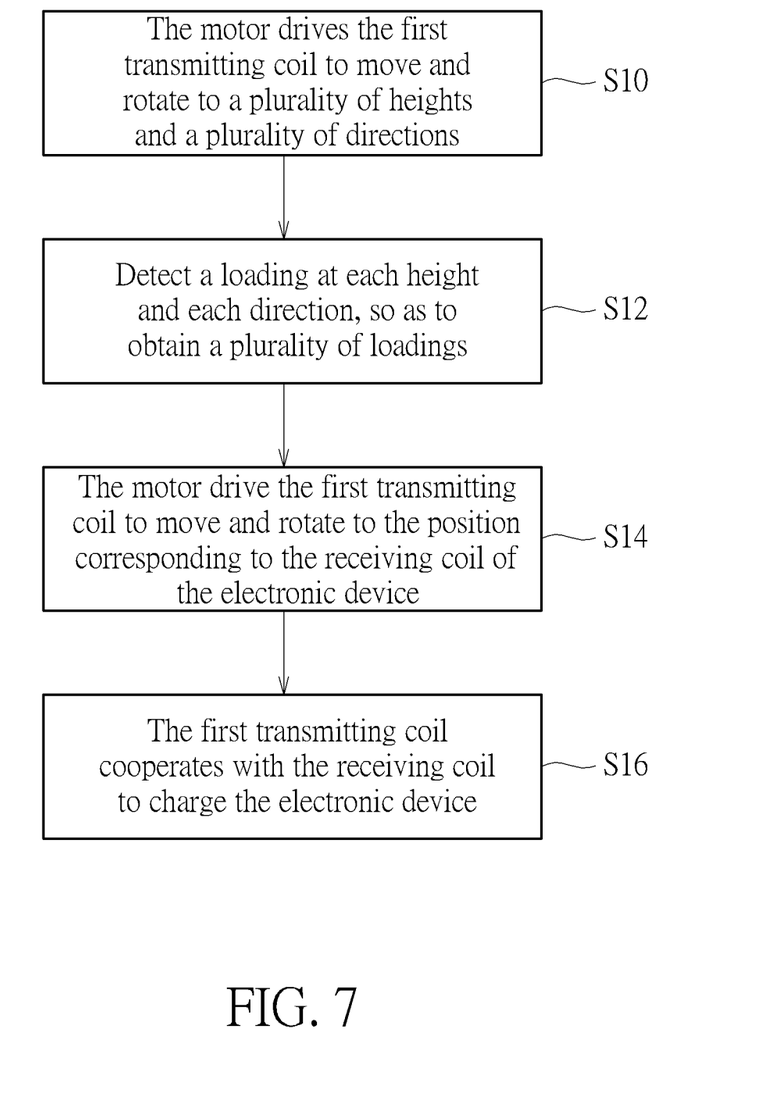
FIG. 7 is a flowchart illustrating a wireless charging method according to an embodiment of the invention.

Referring to FIGS. 1 to 7, FIG. 1 is a perspective view illustrating a wireless charging device 1 according to an embodiment of the invention, FIG. 2 is an exploded view illustrating the wireless charging device 1 shown in FIG. 1, FIG. 3 is a perspective view illustrating the base 10 shown in FIG. 2 from another viewing angle, FIG. 4 is a perspective view illustrating the wireless charging device 1 shown in FIG. 1, FIG. 5 is a functional block diagram illustrating the wireless charging device 1 shown in FIG. 1, FIG. 6 is a perspective view illustrating the rotating axle 120 shown in FIG. 2 driving the rotating member 14 to rotate, and FIG. 7 is a flowchart illustrating a wireless charging method according to an embodiment of the invention. The wireless charging method shown in FIG. 7 is adapted to the wireless charging device 1 shown in FIG. 1.

As shown in FIGS. 1 to 6, the wireless charging device 1 comprises a base 10, a motor 12, a rotating member 14, a first transmitting coil 16, a screw nut 18, a circuit board 20, a control unit 22, a calculating unit 24 and a memory unit 26. In this embodiment, the first transmitting coil 16 may conform to a wireless charging standard established by Wireless Power Consortium (WPC), Power Matters Alliance (PMA) or Alliance for Wireless Power (A4WP) according to practical applications. Furthermore, the motor 12 may be a steeping motor, the circuit board 20 may be a printed circuit board (PCB), the control unit 22 may be a controller for controlling the motor 12, the calculating unit 24 may be a processor with data calculating and processing function, and the memory unit 26 may be a memory or other data storage devices.

The base 10 has a hollow pillar 100 and a ring-shaped groove 102 around the hollow pillar 100. In this embodiment, the hollow pillar 100 is a circular pillar. However, in another embodiment, the hollow pillar 100 may be a polygonal pillar and is not limited to a circular pillar. The circuit board 20 is disposed in the hollow pillar 100. The control unit 22, the calculating unit 24 and the memory unit 26 are disposed on the circuit board 20. The motor 12 is movably disposed in the hollow pillar 100 and the motor 12 has a rotating axle 120. The rotating axle 120 has a first end E1 and a second end E2, wherein the first end E1 is opposite to the second end E2. The rotating member 14 is connected to the first end E1 of the rotating axle 120. The first transmitting coil 16 is disposed on the rotating member 120 and electrically connected to the circuit board 20. The screw nut 18 is disposed in the hollow pillar 100. The second end E2 of the rotating axle 120 has an external screw thread. The external screw thread of the second end E2 of the rotating axle 120 can cooperate with the screw nut 18, such that the second end E2 of the rotating axle 120 is rotatably connected to the screw nut 18. Moreover, the base 10 has two restraining holes 104 located in the hollow pillar 100. The motor 12 further has two restraining pillars 122 movably disposed in the two restraining holes 104, respectively. It should be noted that the number of the restraining pillars 122 and the restraining holes 104 may be determined according to practical applications and are not limited to two.

When the control unit 22 controls the rotating axle 120 of the motor 12 to rotate, the rotating axle 120 drives the first transmitting coil 16 on the rotating member 14 to rotate. Furthermore, the external screw thread of the second end E2 of the rotating axle 120 can cooperate with the screw nut 18 and the restraining pillars 122 of the motor 12 can cooperate with the restraining holes 104 of the base 10, such that the motor 12 can move upward and downward. Accordingly, the first transmitting coil 16 on the rotating member 14 can move and rotate to any directions and heights.

When an electronic device 50 is placed in the ring-shaped groove 102 of the base 10, the control unit 22 can control the motor 12 to drive the first transmitting coil 16 to move and rotate to a plurality of heights and a plurality of directions (step S10 shown in FIG. 7). In this embodiment, the aforesaid heights and directions may represent any heights and directions within a movement range of the motor 12. In practical applications, the control unit 22 may control the motor 12 to move from bottom to top, move from top to bottom, or move from any positions in the beginning. Afterward, the first transmitting coil 16 detects a loading (e.g. magnetic induction) at each height and each direction, so as to obtain a plurality of loadings (step S12 shown in FIG. 7), wherein the height and the direction where a maximum value of the loadings is located at represent a position corresponding to a receiving coil 500 of the electronic device 50. It should be noted that the invention will detect the loading at each height and each direction for all frequency bands of the wireless charging standard of the first transmitting coil 16. Then, the control unit 22 can control the motor 12 to drive the first transmitting coil 16 to move and rotate to the position corresponding to the receiving coil 500 of the electronic device 50 (step S14 shown in FIG. 7), i.e. the height and the direction where the maximum value of the loadings is located at. Then, the first transmitting coil 16 will cooperate with the receiving coil 500 to generate magnetic induction or magnetic resonance, so as to charge a battery (not shown) of the electronic device 50 (step S16 shown in FIG. 7).

In this embodiment, the lifting height and speed of the first transmitting coil 16 may be determined by a pitch of the external screw thread of the second end E2 of the rotating axle 120, wherein the pitch of the external screw thread of the second end E2 of the rotating axle 120 may be determined according to practical applications.

In this embodiment, the calculating unit 24 may determine the intensity value of each detected loading, so as to find out the height and the direction where the maximum value of the loadings is located at. Furthermore, the memory unit 26 may record each height, each direction and the corresponding loading.

In this embodiment, the electronic device 50 may transmit some information including a battery capacity, a current amount of power and so on to the first transmitting coil 16 through the receiving coil 500. Accordingly, the calculating unit 24 may further determine some information including whether the electronic device 50 has been charged completely, an estimated charging time and so on according to the information including a battery capacity, a current amount of power and so on.

It should be noted that the control logic of the wireless charging method shown in FIG. 7 can be implemented by software and circuit design. Needless to say, each part or function of the control logic may be implemented by software, hardware or the combination thereof.

Figure 8:
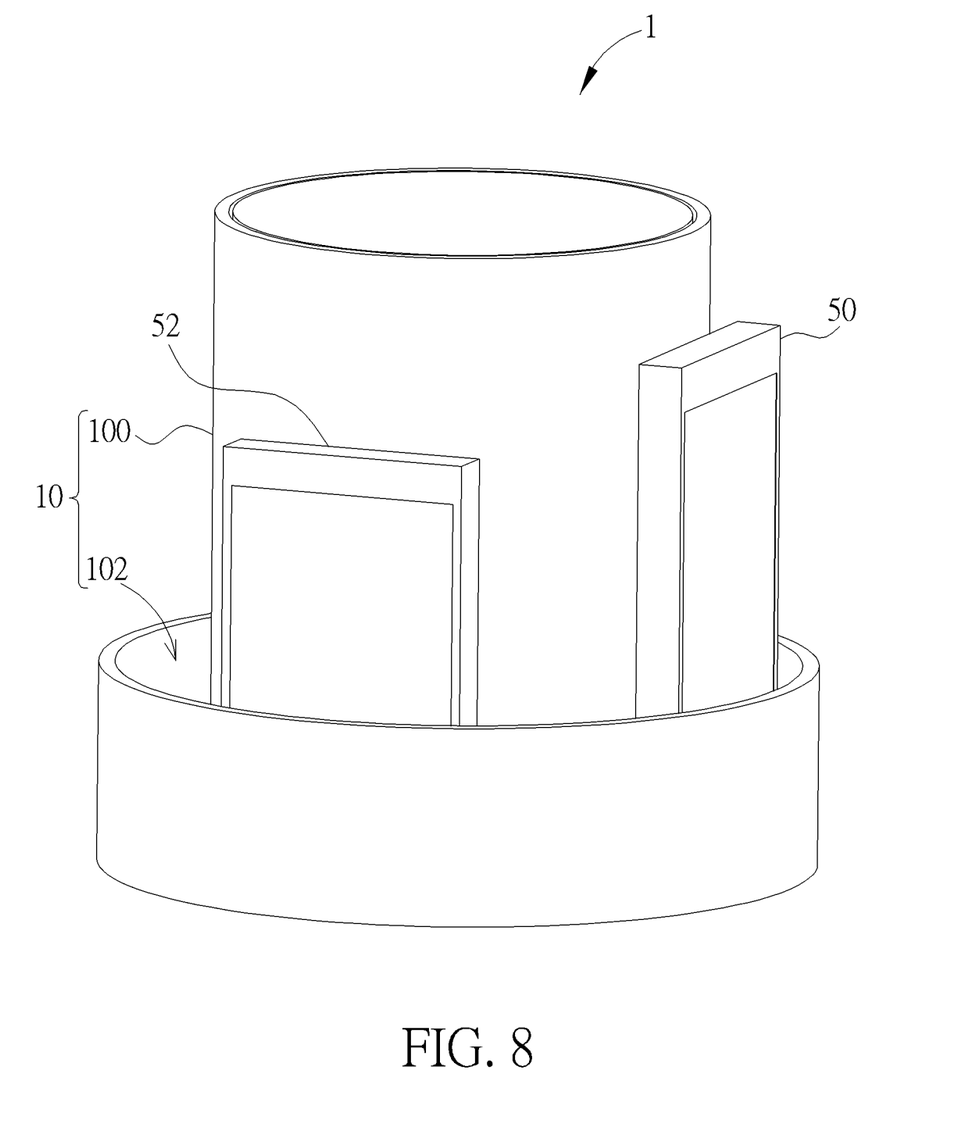
FIG. 8 is a perspective view illustrating two electronic devices placed in the ring-shaped groove of the wireless charging device.

Referring to FIG. 8, FIG. 8 is a perspective view illustrating two electronic devices 50, 52 placed in the ring-shaped groove 102 of the wireless charging device 1. As shown in FIG. 8, a user may place two electronic devices 50, 52 in the ring-shaped groove 102 of the wireless charging device 1, so as to charge the two electronic devices 50, 52. When the two electronic devices 50, 52 are placed in the ring-shaped groove 102 of the wireless charging device 1, the heights and the directions where a plurality of peak values of the loadings detected by the aforesaid step S12 are located at represent the positions corresponding to the receiving coils of the electronic devices 50, 52. At this time, the priority of charging the two electronic devices 50, 52 may be set as follows, 1) charging the electronic device having a maximum amount of power first; 2) charging the electronic device having a minimum amount of power first; 3) charging the electronic device having a shortest distance with respect to the transmitting coil first; and 4) charging the electronic device detected prior to other electronic devices first. It should be noted that the user may place more than two electronic devices in the ring-shaped groove 102 of the wireless charging device 1, so as to charge more than two electronic devices.

Figure 9:
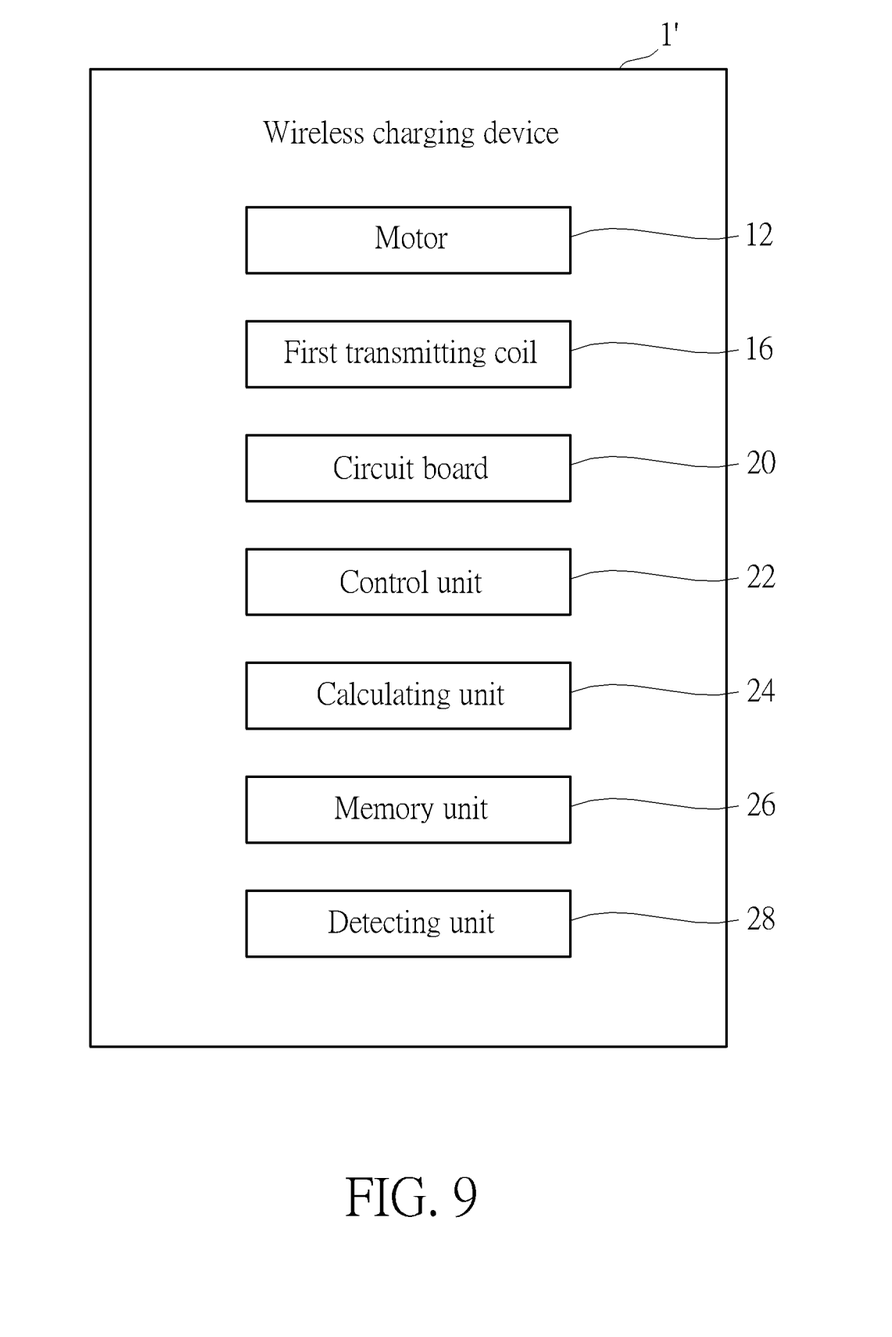
FIG. 9 is a functional block diagram illustrating a wireless charging device according to another embodiment of the invention.

Referring to FIG. 9, FIG. 9 is a functional block diagram illustrating a wireless charging device 1' according to another embodiment of the invention, wherein the wireless charging method shown in FIG. 7 can also be implemented by the wireless charging device 1' shown in FIG. 9. The main difference between the wireless charging device 1' and the aforesaid wireless charging device 1 is that the wireless charging device 1' further comprises a detecting unit 28 disposed on the aforesaid rotating member 14. In step S12 of FIG. 7, the wireless charging device 1' uses the detecting unit 28 to detect a loading (e.g. magnetic induction) at each height and each direction, so as to obtain a plurality of loadings. In this embodiment, the detecting unit 28 may be a near field communication (NFC) coil or other specific coils. It should be noted that the same elements in FIG. 9 and FIG. 5 are represented by the same numerals, so the repeated explanation will not be depicted herein again.

Figure 10:
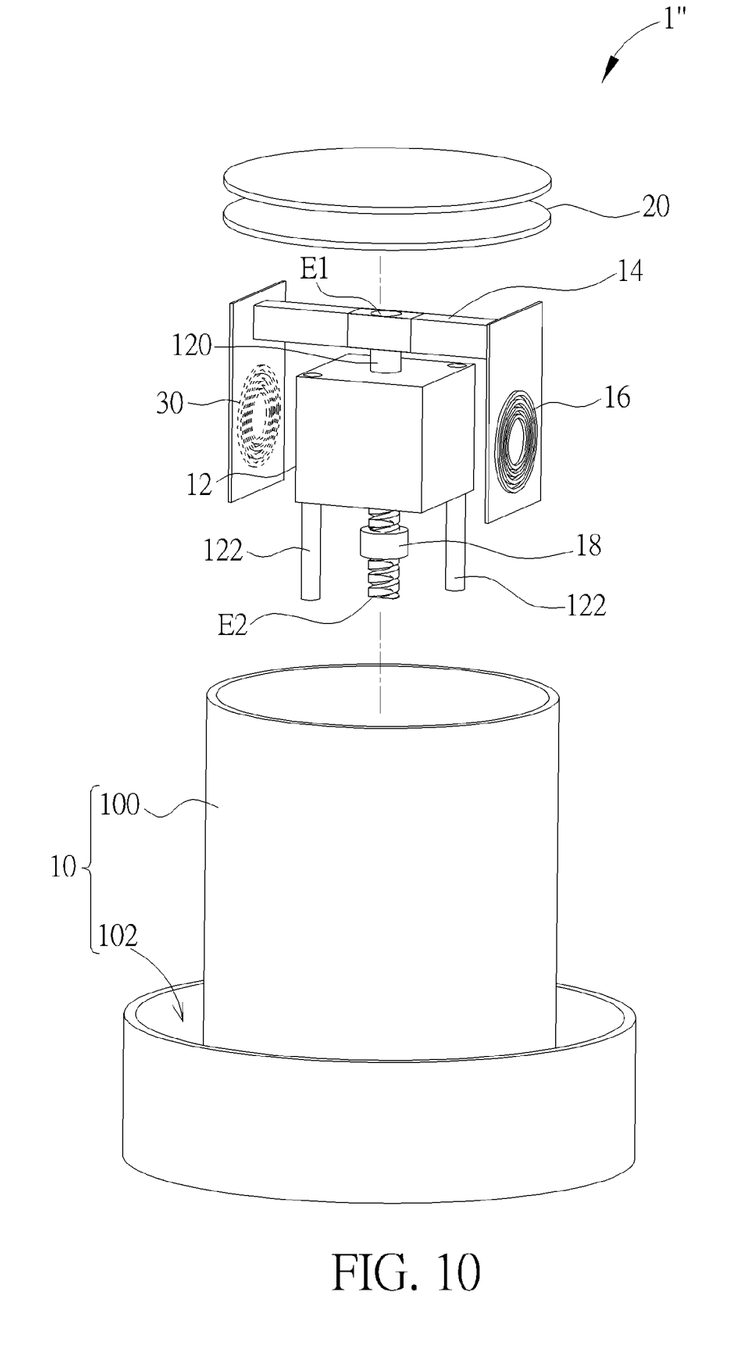
FIG. 10 is an exploded view illustrating a wireless charging device according to another embodiment of the invention

Referring to FIG. 10, FIG. 10 is an exploded view illustrating a wireless charging device 1" according to another embodiment of the invention, wherein the wireless charging method shown in FIG. 7 can also be implemented by the wireless charging device 1" shown in FIG. 10. The main difference between the wireless charging device 1" and the aforesaid wireless charging device 1 is that the wireless charging device 1" further comprises a second transmitting coil 30 disposed on the rotating member 14 and opposite to the first transmitting coil 16. In this embodiment, a wireless charging standard of the first transmitting coil 16 is identical to a wireless charging standard of the second transmitting coil 30. In other words, the first transmitting coil 16 and the second transmitting coil 30 may conform to the same wireless charging standard established by WPC, PMA or A4WP. In another embodiment, a wireless charging standard of the first transmitting coil may be different from a wireless charging standard of the second transmitting coil. For example, the first transmitting coil 16 may conform to the wireless charging standard established by WPC or A4WP, and the second transmitting coil 30 may conform to the wireless charging standard established by PMA.

As mentioned in the above, the invention uses a single motor to drive the transmitting coil to move and rotate to the position corresponding to the receiving coil of the electronic device, such that the first transmitting coil cooperates with the receiving coil to charge the electronic device. Since the invention uses the single motor to move and rotate the transmitting coil, the structure of the invention is simple and the manufacturing cost can be reduced effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless charging device comprising:
   a base having a hollow pillar and a ring-shaped groove around the hollow pillar;
   a motor movably disposed in the hollow pillar, the motor having a rotating axle;
   a rotating member connected to a first end of the rotating axle; and
   a first transmitting coil disposed on the rotating member;
   wherein when an electronic device is placed in the ring-shaped groove, the motor drives the first transmitting coil to move and rotate to a position corresponding to a receiving coil of the electronic device, such that the first transmitting coil cooperates with the receiving coil to charge the electronic device.

2. The wireless charging device of claim 1, further comprising a screw nut disposed in the hollow pillar, a second end of the rotating axle having an external screw thread, such that the second end of the rotating axle is rotatably connected to the screw nut, the first end being opposite to the second end.

3. The wireless charging device of claim 1, wherein the base further has a restraining hole located in the hollow pillar and the motor further has a restraining pillar movably disposed in the restraining hole.

4. The wireless charging device of claim 1, wherein before charging the electronic device, the motor drives the first transmitting coil to move and rotate to a plurality of heights and a plurality of directions, the first transmitting coil detects a plurality of loadings for the heights and the directions, the height and the direction where a maximum value of the loadings is located at represent the position corresponding to the receiving coil of the electronic device.

5. The wireless charging device of claim 4, wherein when a plurality of the electronic devices are disposed in the ring-shaped groove, the heights and the directions where a plurality of peak values of the loadings are located at represent the positions corresponding to the receiving coils of the electronic devices.

6. The wireless charging device of claim 4, further comprising:
   a circuit board disposed in the hollow pillar, the first transmitting coil being electrically connected to the circuit board;
   a control unit disposed on the circuit board, the control unit controlling the motor;
   a calculating unit disposed on the circuit board, the calculating unit determining intensity values of the loadings; and
   a memory unit disposed on the circuit board, the memory unit recording the heights, the directions and the loadings.

7. The wireless charging device of claim 1, further comprising a detecting unit disposed on the rotating member, wherein before charging the electronic device, the motor drives the first transmitting coil to move and rotate to a plurality of heights and a plurality of directions, the detecting unit detects a plurality of loadings for the heights and the directions, the height and the direction where a maximum value of the loadings is located at represent the position corresponding to the receiving coil of the electronic device.

8. The wireless charging device of claim 7, wherein when a plurality of the electronic devices are disposed in the ring-shaped groove, the heights and the directions where a plurality of peak values of the loadings are located at represent the positions corresponding to the receiving coils of the electronic devices.

9. The wireless charging device of claim 7, further comprising:
   a circuit board disposed in the hollow pillar, the first transmitting coil being electrically connected to the circuit board;
   a control unit disposed on the circuit board, the control unit controlling the motor;
   a calculating unit disposed on the circuit board, the calculating unit determining intensity values of the loadings; and
   a memory unit disposed on the circuit board, the memory unit recording the heights, the directions and the loadings.

10. The wireless charging device of claim 1, further comprising a second transmitting coil disposed on the rotating member and opposite to the first transmitting coil.

11. The wireless charging device of claim 10, wherein a wireless charging standard of the first transmitting coil is identical to a wireless charging standard of the second transmitting coil.

12. The wireless charging device of claim 10, wherein a wireless charging standard of the first transmitting coil is different from a wireless charging standard of the second transmitting coil.

13. A wireless charging method adapted to a wireless charging device, the wireless charging device comprising a base, a motor, a rotating member and a transmitting coil, the base having a hollow pillar and a ring-shaped groove around the hollow pillar, the motor being movably disposed in the hollow pillar, the motor having a rotating axle, the rotating member being connected to the rotating axle, the first transmitting coil being disposed on the rotating member, the wireless charging method comprising:
   when an electronic device is placed in the ring-shaped groove, the motor driving the transmitting coil to move and rotate to a plurality of heights and a plurality of directions;
   detecting a plurality of loadings for the heights and the directions, wherein the height and the direction where a maximum value of the loadings is located at represent a position corresponding to a receiving coil of the electronic device;
   the motor driving the transmitting coil to move and rotate to the position corresponding to the receiving coil of the electronic device; and
   the transmitting coil cooperating with the receiving coil to charge the electronic device.

14. The wireless charging method of claim 13, wherein when a plurality of the electronic devices are disposed in the ring-shaped groove, the heights and the directions where a plurality of peak values of the loadings are located at represent the positions corresponding to the receiving coils of the electronic devices.

15. The wireless charging method of claim 14, wherein when the plurality of the electronic devices are disposed in the ring-shaped groove, the wireless charging method further comprises:
   charging the electronic device having a maximum amount of power first.

16. The wireless charging method of claim 14, wherein when the plurality of the electronic devices are disposed in the ring-shaped groove, the wireless charging method further comprises:
   charging the electronic device having a minimum amount of power first.

17. The wireless charging method of claim 14, wherein when the plurality of the electronic devices are disposed in the ring-shaped groove, the wireless charging method further comprises:
   charging the electronic device having a shortest distance with respect to the transmitting coil first.

18. The wireless charging method of claim 14, wherein when the plurality of the electronic devices are disposed in the ring-shaped groove, the wireless charging method further comprises:
   charging the electronic device detected prior to other electronic devices first.

* * * * *